United States Patent
Yung et al.

(10) Patent No.: US 6,643,268 B1
(45) Date of Patent: Nov. 4, 2003

(54) METHOD FOR RE-ROUTING SIGNALS IN A SWITCH NETWORK

(75) Inventors: Kar W. Yung, Torrance, CA (US); David C. Cheng, Palos Verdes Estates, CA (US); Thu-Tam Trinh-Perches, Santa Monica, CA (US); Kenneth N. Gibson, Redondo Beach, CA (US)

(73) Assignee: Hughes Electronics Corporation, El Segundo, CA (US)

( * ) Notice: Subject to any disclaimer, the term of this patent is extended or adjusted under 35 U.S.C. 154(b) by 0 days.

(21) Appl. No.: 09/379,168

(22) Filed: Aug. 23, 1999

(51) Int. Cl.[7] .............................................. H04L 12/28
(52) U.S. Cl. ...................................... 370/254; 370/216
(58) Field of Search ................................. 370/254, 255, 370/256, 257, 258, 216, 217, 221, 225, 226, 227, 228, 360, 369, 380, 401, 235, 237, 238, 238.1, 400, 408; 333/100, 101

(56) References Cited

U.S. PATENT DOCUMENTS

| | | | | |
|---|---|---|---|---|
| 4,806,887 A | * | 2/1989 | Au-Yeung | 333/106 |
| 4,967,170 A | * | 10/1990 | Hettlage et al. | 333/106 |
| 5,940,373 A | * | 8/1999 | Chiu et al. | 370/238 |
| 6,226,111 B1 | * | 5/2001 | Chang et al. | 359/110 |
| 6,282,170 B1 | * | 8/2001 | Bentall et al. | 370/225 |
| 6,418,139 B1 | * | 7/2002 | Akhtar | 370/225 |
| 6,421,349 B1 | * | 7/2002 | Grover | 370/227 |

* cited by examiner

Primary Examiner—Douglas Olms
Assistant Examiner—Brian Nguyen
(74) Attorney, Agent, or Firm—Terje Gudmestad

(57) ABSTRACT

A method (100) for identifying re-routing path solutions for signals within a switch network (10). The path solutions are subject to special constraints that provide the most desired solution for a user. The method applies an algorithm that works by transforming a global problem (110) into many individual sub-problems (112). The algorithm then solves the individual sub-problems (112) systematically according to desired constraints until the global solution is met (120). The method finds a unique state for each switch such that the overall requirements of the system are met.

5 Claims, 2 Drawing Sheets

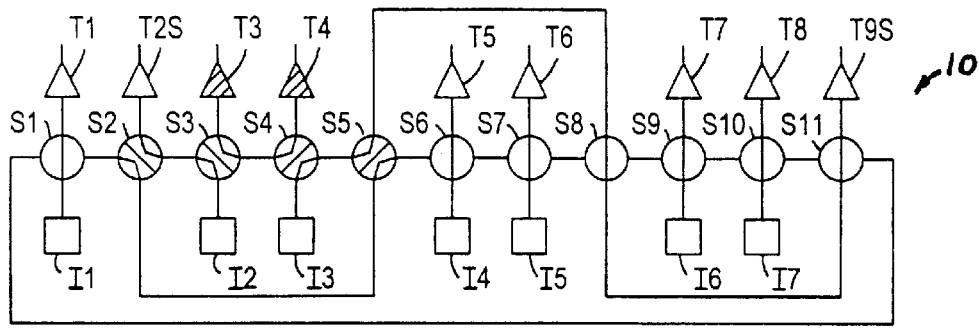
FIG. 1
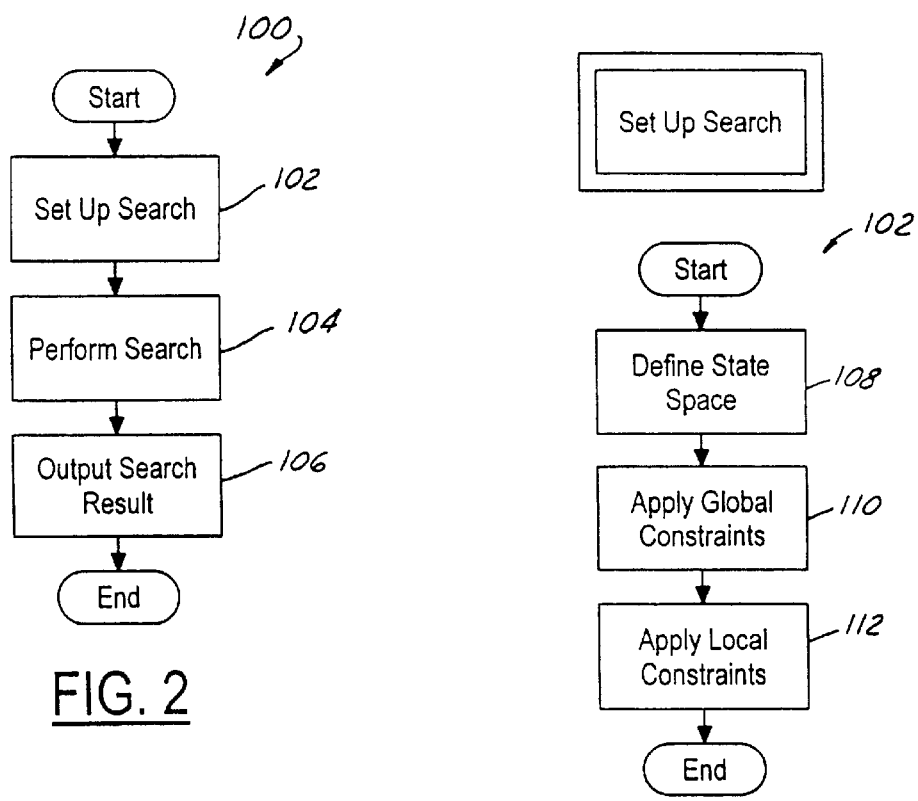
FIG. 2
FIG. 3

METHOD FOR RE-ROUTING SIGNALS IN A SWITCH NETWORK

TECHNICAL FIELD

The present invention relates to switch networks, and more particularly, the present invention relates to a method for determining a signal path to avoid failed devices in a switch network.

BACKGROUND ART

Typical communication satellites contain networks of traveling wave tube amplifiers (TWTA's) that consists of many active devices and backup devices. Should a TWTA fail, a backup is activated. The signal is re-routed around the failed device through switches. In the past, TWTA networks were small and relatively simple to design and analyze. However, today's communication satellites are equipped with larger TWTA networks, increasing the complexity of the payload.

Presently, the method of determining the switch states during a TWTA failure involves manually finding a re-route path. For smaller and simpler TWTA networks, the task is tedious, but relatively easy. For more complex TWTA networks, the task becomes time consuming and, due to the volume of switches and TWTA's, is prone to human error.

In the brute force method, the search involves checking all the possible states for all of the switches. The brute force method used to re-route signals is tedious. For example, in a typical "R"-switch network, each switch has three possible states. There may be fifty or more switches in the network. This translates into $3^{50}$ or $7 \times 10^{23}$ possible states. If 1 micro-second of processing time per state is allowed, it would take approximately 22 billion years to process a 50 switch ring on a typical computer.

The use of "R"-switches also limits the network's capabilities. For example, "R"-switch networks cannot recover multiple consecutive TWTA failures. New switches, such as "M"-switches, are more complex, but they can accommodate multiple consecutive TWTA failures. Unlike "R" swtiches, "M" switches consist of six individual ports, allowing interconnections that are more complex and functional. Thus using the traditional method of analyzing switch paths becomes overwhelming with a more complicated switch limiting their use.

An improved method of analyzing a switch network will allow more complex switching networks to be employed which could potentially result in weight reductions for spacecraft applications. Also, the time required to design a network could be significantly reduced.

SUMMARY OF THE INVENTION

The method of the present invention finds re-routing path solutions for signals within a switch network. The path solutions can be subject to special constraints that provide the most desired solution. The method applies an algorithm that works by transforming a global problem into many individual sub-problems. It then solves the individual sub-problems systematically according to desired constraints until the global solution is met. In other words, the algorithm finds a unique state for each switch such that the overall requirements of the system are met.

It is an object of the present invention to increase the reliability of a TWTA network by using more advanced switches without compromising design cycle time. It is another object of the present invention to determine a re-routed signal path to avoid a failed device.

It is a further object of the present invention to break a global problem into many individual problems that can be solved individually until a solution to the global problem is found. It is still a further object of the present invention to apply local constraints to each individual problem until global constraints are satisfied.

Other objects and features of the present invention will become apparent when viewed in light of the detailed description of the preferred embodiment when taken in conjunction with the attached drawings and appended claims.

BRIEF DESCRIPTION OF THE DRAWINGS

FIG. 1 is an illustration of a solution for a 9 TWTA network having two failed TWTA's;

FIG. 2 is a general flow chart of the method of the present invention;

FIG. 3 is a specific flow chart for the step of setting up the search for the algorithm of the present invention;

BEST MODE(S) FOR CARRYING OUT THE INVENTION

Figures 4, 5:
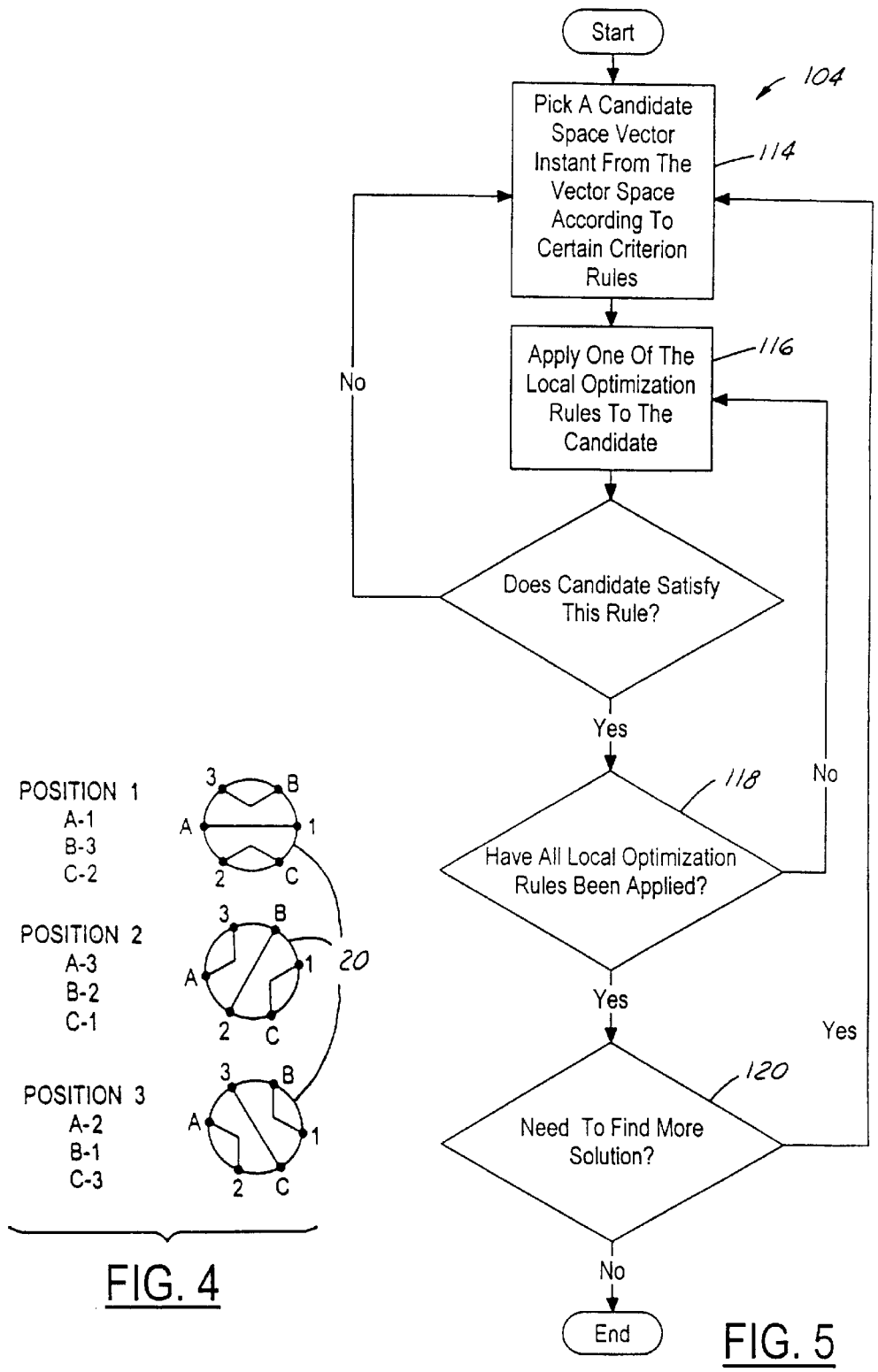
FIG. 4 is a diagram of an M-switch and the three possible states associated therewith.
FIG. 5 is a specific flow chart for the step of performing the search for the algorithm of the present invention.

The present invention will be described herein with reference to a TWTA network 10, an example of which is shown in FIG. 1. There are nine TWTA's in the depicted network and they are labeled T1 through T9. The second and ninth TWTAs are further delineated by "s" to indicate that they are spare TWTA's. There are eleven "R"-switches S1 through S11. Seven inputs from Traveling Wave Tube Amplifiers are labeled I1 through I7.

It should be noted that while the method of the present invention is being described as it applies to a TWTA network, it is possible to employ the algorithm in many possible switch network applications using many possible switch configurations. For example, the invention is not limited to traveling wave tube amplifiers and "R" or "M"-switches.

In any event, a network employing the algorithm of the present invention applies to a network of items with redundancy. Each item can be failed or functional. When the item is functional, it can be active or dormant. The items are connected by switches. At any instant, a switch can be in one of the states specified by a user. The connections between the switches are also defined by the user. When an active functional item fails, it is to be replaced by a dormant functional item.

In the example shown in FIG. 1, two of the TWTA's, T3 and T4, are failed. (They are shaded to indicate that they are failed devices). The algorithm of the present invention will provide a solution to the global problem in FIG. 1 by applying local constraints on each switch until the global constraints are met. The constraints will be specific to the application of the algorithm.

There are three basic properties to the algorithm: state space, rules, and control strategy. The state space is defined as the space of all the possible hardware configuration states of the switches in the network. A valid solution, of which there may be more than one, requires that each switch be in one of the possible states. In the present example, there are $3^9$, or 19,683, total possible states, some of which would yield solutions.

The rules of the algorithm determine how the search is conducted and checks the operation to make sure the solution is found. The rules are used in conjunction with global and local constraints and ensure the constraints are being met.

Some of the rules of the algorithm are independent of the type of switch network. For example, each switch must be connected to others according to the network configuration. A user will have to specify how many switches, what type of switch, how many states, their inter-relation to each other and their inter-relation to other devices in the network.

Another example of a network-independent rule is that the connectivity between switches should be consistent with physically allowable signal flow. Signals cannot flow towards each other along any path.

The algorithm examines switch states that are not acceptable for a valid solution and immediately eliminates them from consideration. For example, in the network shown in FIG. 1, the switches S3 and S4, associated with the failed TWTA's T3 and T4, have states that are not acceptable for a valid solution. As a result, it becomes obvious that many choices are eliminated.

The global constraints apply to the overall solution to the problem. In the present example, a global constraint is to re-route the signal path to avoid the two failed TWTA's T3 and T4.

Local constraints are applied to each of the individual switches in the network. The local constraints will be imposed such that when each switch meets the requirements of the local constraints, the global constraints are automatically met. The rules are used to implement the constraints.

The local constraints are applied to each switch individually and the algorithm will search among all possible states until the local constraints are met. Once met, the algorithm moves to the next switch, and so on, until all the switches have met their local constraints. When the local constraints for each switch have been met, the global constraints are automatically satisfied. The switch path choices that are immediately eliminated because of a failed device are examples of local constraints for the switches.

Another property of the algorithm is the control strategy. The control strategy determines the order that the rules are applied. The control strategy also determines what constraints, global and local, are placed on the search.

The conventional control strategy approach is to find all possible solutions first, then apply specific requirements or criteria which will determine which switch path solutions are desirable. This set of desirable solutions depends on search criteria or requirements. For example, in some mode of operation in a TWTA network, it is desirable to minimize Effective Isotropic Radiated Power (EIRP) losses, which are power losses due to waveguides or coaxial cables. In the minimum EIRP loss search requirement, the global constraints require that a signal pass through as few switches as possible since passing through a switch results in additional EIRP degradation. The solution generated by the algorithm may be altered when this is taken into account.

The control strategy for the minimum EIRP example will apply network specific rules that set local constraints on the switches to restrict the number of switches that the signal can pass through. For example, first the rules will restrict the number of switches the signal can pass through to one. The process will be repeated, increasing this limit until a solution is found. When a solution is found, the minimum EIRP requirement is automatically satisfied.

The algorithm of the present invention finds all possible solutions. Therefore, if only one solution exists, the algorithm will find it. This cannot always be accomplished using traditional heuristic algorithms. A valid solution must satisfy the global constraints. The present invention continues to search using the algorithm until no additional solutions are found. The user can specify how many solutions are desired. If a solution cannot be found within the given constraints, then the failures yield no valid solution.

In general, the method of the present invention can be described by the flow chart shown in FIG. 2. Basically, the first step is to set up the search 102, then perform the search 104 and output the search results 106.

Setting up the search 102 is further defined with reference to FIG. 3. The first step in setting up the search is to determine the state space 108 which is a function of the hardware network configuration. For example, a TWTA network consists of a number of switches, each having several discrete states. A network of n switches having k states will have a state space equal to $k^n$. Referring to FIG. 4, an M-switch 20 is shown. There are three possible positions, and six possible ports, A, B, C, and 1, 2, 3. In position 1, port A and port 1 are connected, port B and port 3 are connected, and port C and port 2 are connected. In position 2, port A and port 3 are connected, port B and port 2 are connected, and port C and port 1 are connected. In position 3, port A and port 2 are connected, port B and port 1 are connected, and port C and port 3 are connected.

A state vector for a TWTA network can be defined as a list of states of all of the switches in the network. All possible state vector values defines the state space. An instant of the state vector corresponds to a situation when every switch in the network will be in a defined state.

With reference to FIG. 3, once the state space is determined, global constraints 110 are determined based on the desired outcome. Global optimization determines the requirements for a state vector to be a valid solution. An instant of the state vector corresponds to a certain connectivity of all ports of the TWTA network. However, it may not be physically possible. For example, port 1 of switch 1 may not be physically connected to port A of switch 4. The purpose of global optimization is to define all the requirements for an instant of the state vector to be a valid solution. These requirements are based on the physical connectivity between switches, i.e., what actual components are associated with which ports. A valid solution for the TWTA network must also correspond to proper signal flows from all input nodes to TWTA's for all channels.

Local constraints 112 are determined for each switch. While the global constraints discussed above are applicable to all components of the state vector simultaneously, the local constraints apply to each component of the state vector individually. All of the local constraints, when applied as a whole, must be equivalent to the global constraints.

Referring back to FIG. 2, the state space 104 is searched within the global and local constraints until each switch satisfies its local constraints. FIG. 5 explains the search 104 in detail. The search begins by picking a candidate space vector instant 114 from the vector space according to the rules. For example, a candidate space vector state that corresponds to a switch state configuration in the TWTA network is chosen. The rules applied to picking the candidate space vector instant depends on whether the algorithm is finding a shortest path, minimum EIRP, or other selection criteria. In other words, a different candidate will be chosen depending on the selection criteria. The local optimization rules will be applied 116 individually to each candidate until the candidate satisfies the rule and until all of the rules have been applied.

A solution is identified 120 when each switch satisfies its local constraints. In such a case, the global constraints are automatically met. The process is repeated until all possible states in the state space have been searched. At this point, the algorithm will determine if all possible, or all desired, solutions have been identified 120. Referring again to FIG. 2, when the search is complete, the results are output 106.

While particular embodiments of the invention have been shown and described, numerous variations and alternate embodiments will occur to those skilled in the art. Accordingly, it is intended that the invention be limited only in terms of the appended claims.

What is claimed is:

1. A method for finding signal re-route paths in a switch network comprising the steps of:

defining a state space for said switch network;

applying rules necessary to meet global constraints for a solution, said step of applying rules further comprises:

defining a network configuration in which each switch is connected to other switches in a pattern defined by a user;

defining consistent signal flow paths between switches;

eliminating from consideration all switch states that are not possible;

applying local constraints to each switch in said switch network;

searching said state space until each switch satisfies its local constraints whereby said global constraints are satisfied and a re-route path is identified.

2. A method for finding signal re-route paths in a switch network having n switches with R states, said method comprising the steps of:

defining a state space, $k^n$;

applying rules necessary to meet global constraints for a solution, said step of applying rules further comprises;

defining a network configuration in which each switch is connected to other switches in a pattern defined by a user;

defining consistent signal flow paths between switches;

eliminating from consideration all switch states that are not possible;

applying local constraints to each switch in said switch network;

searching said state space until each switch satisfies its local constraints whereby said global constraints are satisfied and a re-route path is identified.

3. A method for finding signal re-route paths to by-pass at least one failed device in a switch network having n switches with k states, said method comprising the steps of:

defining a state space, $k^n$;

applying rules necessary to meet global constraints for a solution;

applying local constraints to each switch in said switch network;

searching said state space until each switch satisfies its local constraints whereby said global constraints are satisfied and a re-route path is identified; and wherein said failed devices are part of a network of traveling wave tube amplifiers.

4. The method as claimed in claim 3 wherein said step of applying rules further comprises:

defining a network configuration in which each switch is connected to other switches in a pattern defined by a user;

defining consistent signal flow paths between switches; and eliminating from consideration all switch states that are not possible.

5. A method for finding signal re-route paths to by-pass at least one failed device in a switch network having n switches with k states, said method comprising the steps of:

defining a state space, $k^n$;

applying rules necessary to meet global constraints for a solution, said step of applying rules further comprises:

defining a network configuration in which each switch is connected to other switches in a pattern defined by a user;

defining consistent signal flow paths between switches;

eliminating from consideration all switch states that are not possible;

allying local constraints to each switch in said switch network;

searching said state space until each switch satisfies its local constraints whereby said global constraints are satisfied and a re-route path is identified.

* * * * *